United States Patent
Chen et al.

(10) Patent No.: US 9,914,395 B1
(45) Date of Patent: Mar. 13, 2018

(54) ELECTROCHROMIC REARVIEW MIRROR

(71) Applicant: Licon Technologies Inc., Hemei Township, Changhua County (TW)

(72) Inventors: Wen-Li Chen, Hemei Township (TW); Wen-Yi Chen, Hemei Township (TW)

(73) Assignee: Licon Technologies Inc., Hemei Township, Changhua County (TW)

( * ) Notice: Subject to any disclaimer, the term of this patent is extended or adjusted under 35 U.S.C. 154(b) by 70 days.

(21) Appl. No.: 15/259,456

(22) Filed: Sep. 8, 2016

(51) Int. Cl.
| | |
|---|---|
| *G02F 1/153* | (2006.01) |
| *B60R 1/08* | (2006.01) |
| *G02F 1/157* | (2006.01) |
| *G02F 1/155* | (2006.01) |

(52) U.S. Cl.
CPC .............. *B60R 1/088* (2013.01); *G02F 1/155* (2013.01); *G02F 1/157* (2013.01)

(58) Field of Classification Search
CPC .................................................. A62B 18/003
USPC ......................................................... 359/266
See application file for complete search history.

(56) References Cited

U.S. PATENT DOCUMENTS

2012/0236387 A1* 9/2012 Bugno .................... B60R 1/088
359/267

FOREIGN PATENT DOCUMENTS

WO    WO2004098953 A2    11/2004

* cited by examiner

*Primary Examiner* — James Jones
(74) *Attorney, Agent, or Firm* — Alan D. Kamrath; Kamrath IP Lawfirm, P.A.

(57) ABSTRACT

An electrochromic rearview mirror contains a connection assembly, and the connection assembly includes: a first substrate, a first coating layer, a second coating layer, a packaging frame, an electrochromic layer, a first conductive glue, a second conductive glue, at least one third coating layer, at least one fourth coating layer, and a second substrate. The first substrate has a first face and a second face, and the second substrate has a third face and a fourth face. The second coating layer conducts electricity, each of the at least one fourth coating layer is fixed on the third face, and each of the at least one third coating layer is disposed on the third face. Furthermore, the packaging frame and the electrochromic layer are defined among the second coating layer, the fourth coating layer and the third coating layer.

8 Claims, 5 Drawing Sheets

ELECTROCHROMIC REARVIEW MIRROR

BACKGROUND OF THE INVENTION

Field of the Invention

The present invention relates to a rearview mirror which is fixed on a vehicle, and more particularly to the rearview mirror which changes colors and reflectivity by conducting electricity after sensing lights, thus avoiding glares.

Description of the Prior Art

A conventional rearview mirror is an electrochromic rearview mirror which changes colors and reflectivity based on using environment, and a plastic casing covers a glass periphery of the electrochromic rearview mirror so as to obtain aesthetics appearance. In addition, a decoration fringe is electroplated on the glass periphery and has a fixed color, and a color changeable portion is arranged in the decoration fringe, so a color difference occurs, and the decoration fringe influences an appearance of the electrochromic rearview mirror.

Vehicle rearview mirror elements and assemblies incorporating these elements are disclosed in WO 2004098953, a color difference between a glass periphery and a color changeable portion of the rearview mirror produces to influence appearance. In addition, an opaque material 176 is coated on a first face 112a so as to avoid light reflection on a closing element 116 (see page 32). The opaque material on the first face causes the color difference between the glass periphery and the color changeable portion of the rearview mirror, thereby having poor visual effect.

The present invention has arisen to mitigate and/or obviate the afore-described disadvantages.

SUMMARY OF THE INVENTION

The primary objective of the present invention is to provide an electrochromic rearview mirror which when the b* value (CIE L*a*b* (CIELAB, International Commission on Illumination L*a*b*), b* value means one of opposite spatial locations of Lab color space) of the first substrate, the second coating layer, the electrochromic layer, the third coating layer, and the fourth coating layer is less than or is equal to the b* value of the first substrate and the second coating layer, a visible color difference reduces between the outer rim and interior of the first substrate from the first face of the first substrate.

Another objective of the present invention is to provide an electrochromic rearview mirror which has aesthetics appearance and its thickness is thin.

An electrochromic rearview mirror provided by the present invention contains a connection assembly, and the connection assembly includes: a first substrate, a first coating layer, a second coating layer, a packaging frame, an electrochromic layer, a first conductive glue, a second conductive glue, at least one third coating layer, at least one fourth coating layer, and a second substrate.

The first substrate is transparent, and the first substrate has a first face and a second face, wherein the first face faces user and is viewable by the user, and the second face is located behind the first face.

The second substrate has a third face and a fourth face, and the third face is adjacent to the second face of the first substrate.

The first coating layer is arranged on an external periphery of the second face of the first substrate, and the first coating layer is in a ring shape and is configured to shield the second coating layer.

The second coating layer is transparent and is mounted on the second face of the first substrate and covers the first coating layer, wherein the second coating layer conducts electricity.

Each of the at least one fourth coating layer is made of metal material, and said each fourth coating layer is fixed on and coves the third face of the second substrate, wherein the fourth coating layer is configured to reflect images.

Each of the at least one third coating layer is disposed on the third face of the second substrate and covers the fourth coating later, wherein said each third coating layer is configured to adjust colors and conducts the electricity.

The packaging frame and the electrochromic layer are defined among the second coating layer of the first substrate, and the fourth coating layer and the third coating layer of the second substrate, wherein the packaging frame is annular and hollow, and two side surfaces of the packing frame are closed by the second coating layer and the third coating layer.

The electrochromic layer produces colors or changes chroma as the electricity conducts, wherein the electrochromic layer is arranged on a hollow portion of the packaging frame and contacts the second coating layer and the third coating layer.

When the user views the first face of the first substrate from the connection assembly, a first sight line forms on the first substrate and the first coating layer, wherein the first sight line has a b* value and is located on the outer rim of the first substrate.

When the user views the first face of the first substrate from the connection assembly, a second sight line forms on the first substrate, the first coating layer, the electrochromic layer, the third coating layer, the fourth coating layer, and the second substrate, wherein the second sight line has a b* value and is less than or is equal to the b* value of the first sight line.

The b* value of the first line is within −2 to 0, and the b* value of the second line is within −5 to 0.

The first conductive glue and the second conductive glue are arranged on an external surface or an outer rim of the connection assembly, the first conductive glue conducts the second coating layer, and the second conductive glue conducts the third coating layer.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
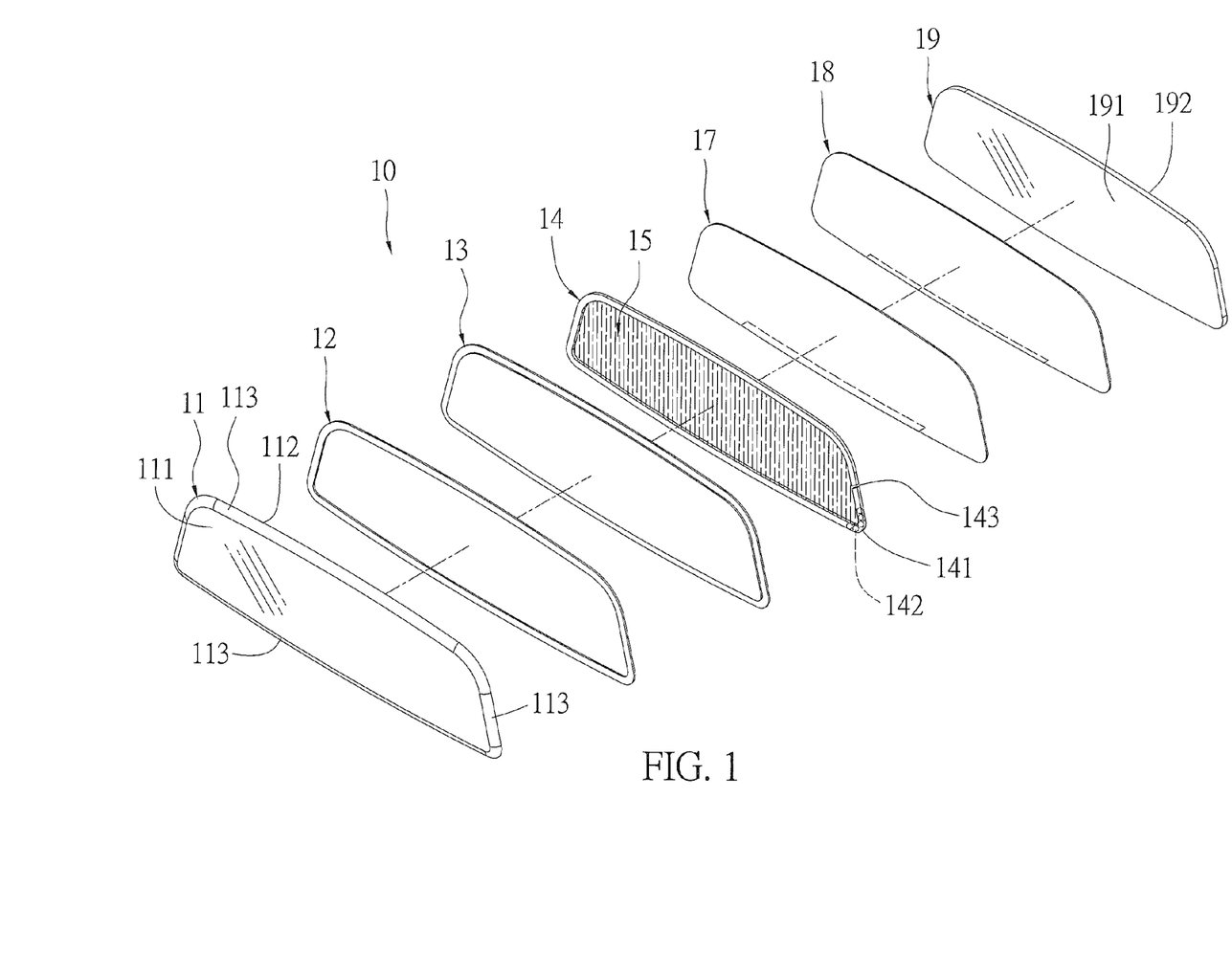
FIG. 1 is a perspective view showing the exploded components of an electrochromic rearview mirror in accordance with a first embodiment of the present invention.
Figure 2:
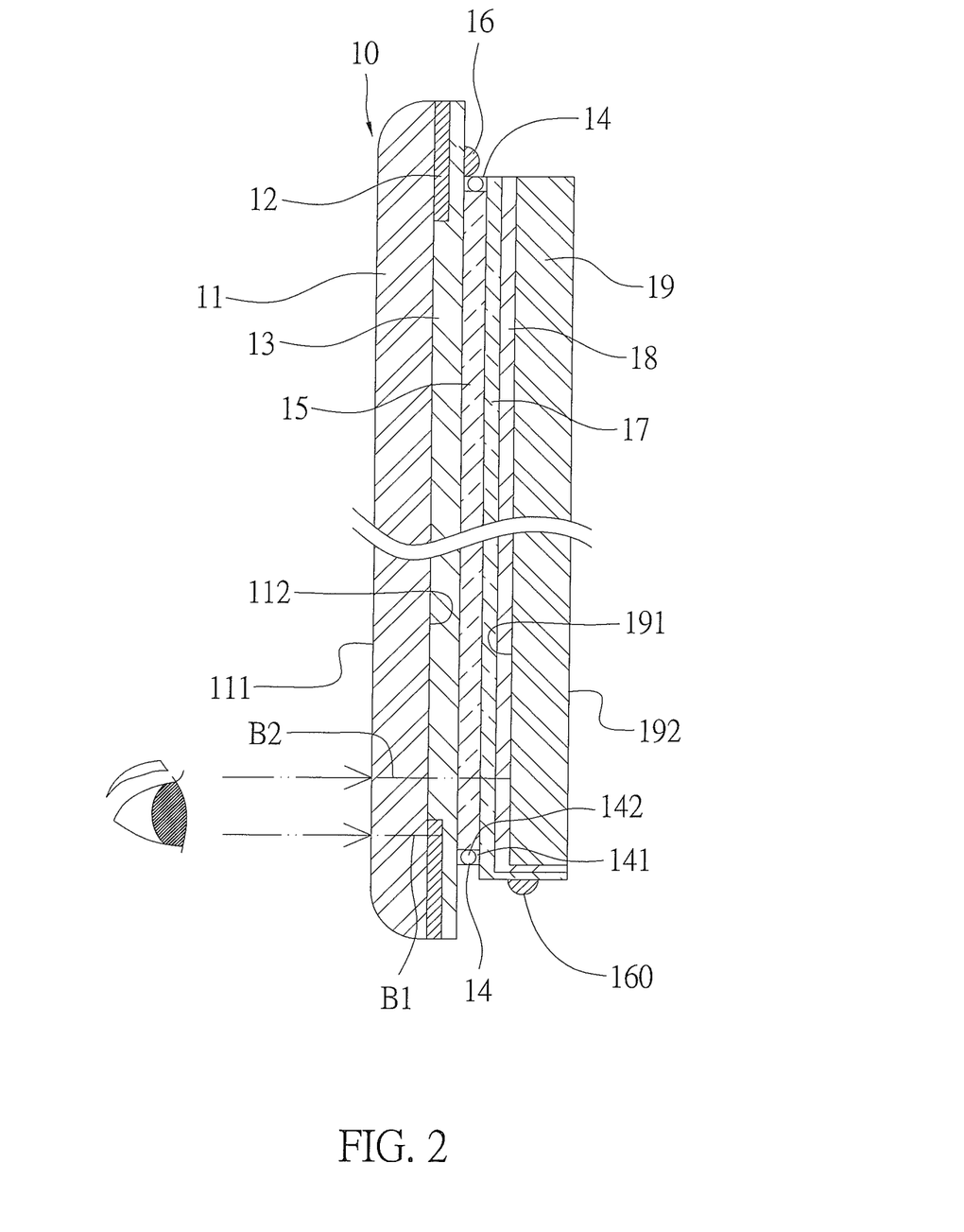
FIG. 2 is a cross sectional view showing the assembly of the electrochromic rearview mirror in accordance with the preferred embodiment of the present invention.

Referring to FIGS. 1 and 2, an electrochromic rearview mirror according to a first embodiment of the present invention comprises a connection assembly 10, and the connection assembly 10 includes: a first substrate 11, a first coating layer 12, a second coating layer 13, a packaging frame 14, an electrochromic layer 15, a first conductive glue 16, a second conductive glue 160, at least one third coating layer 17, at least one fourth coating layer 18, and a second substrate 19.

The first substrate 11 is transparent (i.e., the first substrate 11 is made of glass or acrylic), and the first substrate 11 has a first face 111 and a second face 112, wherein the first face 111 faces user and is viewable by the user, and the second face 112 is located behind the first face 111. In addition, the first substrate 11 has a peripheral fringe 113 integrally arranged on an outer rim thereof, and the peripheral fringe 113 has at least one arcuate section.

The second substrate 19 has a third face 191 and a fourth face 192, the third face 191 is adjacent to the second face 112 of the first substrate 11, and an outer rim of the second substrate 19 is less than the outer rim of the first substrate 11.

The first coating layer 12 is arranged on an external periphery of the second face 112 of the first substrate 11, and the first coating layer 12 is in a ring shape and is configured to shield the second coating layer 13, wherein the peripheral fringe 113 of the first substrate 11 is located within the first coating layer 12.

The second coating layer 13 is transparent and is mounted on the second face 112 of the first substrate 11 and covers the first coating layer 12, wherein a size of an outer rim of the second coating layer 13 is equal to that of the first substrate 11.

Each of the at least one fourth coating layer 18 is made of metal material coating layer, such as silver, chromium or chromium alloy, and contains at least one oxide layer, and a number of the at least one fourth coating layer 18 is one or more than one. In this embodiment, a fourth coating layer 18 is fixed on and covers the third face 191 of the second substrate 19, wherein the fourth coating layer 18 is configured to reflect images, and a size of an outer rim of the fourth coating layer 18 is less than that of the first substrate 11.

Each of the at least one third coating layer 17 is disposed on the third face 191 of the second substrate 19 and covers the fourth coating later 18, wherein said each third coating layer 17 is configured to adjust colors, and a size of an outer rim of the third coating layer 17 is less than that of the first substrate 11. In another embodiment, the fourth coating layer 18 is configured to adjust the colors, and the third coating layer 17 is configured to reflect the images.

The packaging frame 14 and the electrochromic layer 15 are defined among the second coating layer 13 of the first substrate 11, the fourth coating layer 18 and the third coating layer 17 of the second substrate 19, wherein the packaging frame 14 is comprised of multiple binders 141 and multiple glass balls 142, each of the multiple glass balls 142 is configured to define an accommodation space between the first substrate 11 and the second substrate 19 so as to house the electrochromic layer 15, and a size of an outer rim of the packaging frame 14 is less than that of the first substrate 11.

The packaging frame 14 is annular and hollow, and two side surfaces of the packing frame 14 are closed by the second coating layer 13 and the third coating layer 17, wherein the second coating layer 13 and the third coating layer 17 conduct electricity, and the packing frame 14 includes a cutout 143 defined on an outer rim thereof.

The electrochromic layer 15 is liquid or colloidal and produces the colors or changes chroma as electricity conducts, wherein the electrochromic layer 15 is arranged on a hollow portion of the packaging frame 14 and contacts the second coating layer 13 and the third coating layer 17, the electrochromic layer 15 is fed into the cutout 143 of the packaging frame 14 and fills with the hollow portion of the packing frame 14, and the cutout 143 is solidified and is closed by adding the multiple binders 141 so as to avoid leakage of the electrochromic layer 15.

When the user views the first face 111 of the first substrate 11 from the connection assembly 10, a first sight line B1 forms on the first substrate 11 and the first coating layer 12, wherein the first sight line B1 has a b* value (CIE L*a*b* (CIELAB, International Commission on Illumination L*a*b*), b* value means one of opposite spatial locations of Lab color space) and is located on the outer rim of the first substrate 11.

When the user views the first face 111 of the first substrate 11 from the connection assembly 10, a second sight line B2 forms on the first substrate 11, the first coating layer 12, the electrochromic layer 15, the third coating layer 17, the fourth coating layer 18, and the second substrate 19, wherein the second sight line B2 has a b* value and is less than or is equal to the b* value of the first sight line B1.

CIE L*a*b* (CIELAB) represents a visible color mode viewed by human eyes, the b* value means one of opposite spatial locations of Lab colors, wherein L*, a*, and b* respectively represent three-dimensional coordinate positions of the colors and brightness, L* value means one of opposite spatial locations of Lab colors denotes the brightness (L*, L*=0 black generation, and L*=100 white indication), a* is a position of red color or between red color and green color (when a* value is negative, it represents the green color, and when a* value is positive, it means the red color), b* is a position between yellow color and blue color (when b* value is negative, it represents the blue color, and when b* value is positive, it means the yellow color).

The b* value of the first line B1 is within −2 to 0, and the b* value of the second line B2 is within −5 to 0.

The first conductive glue 16 and the second conductive glue 160 are arranged on an external surface or an outer rim of the connection assembly 10, the first conductive glue 16 conducts the second coating layer 13, the second conductive glue 160 conducts the third coating layer 17, wherein the first conductive glue 16 and the second conductive glue 160 are respectively electrically connected with two electrodes of a power supply (not shown).

Referring to FIG. 2, the first conductive glue 16 and the second conductive glue 160 are arranged on the outer rim of the connection assembly 10, and the first conductive glue 16 conducts and contacts the second coating layer 13, and the second conductive glue 160 conducts and contacts the third coating layer 17.

Figure 3:
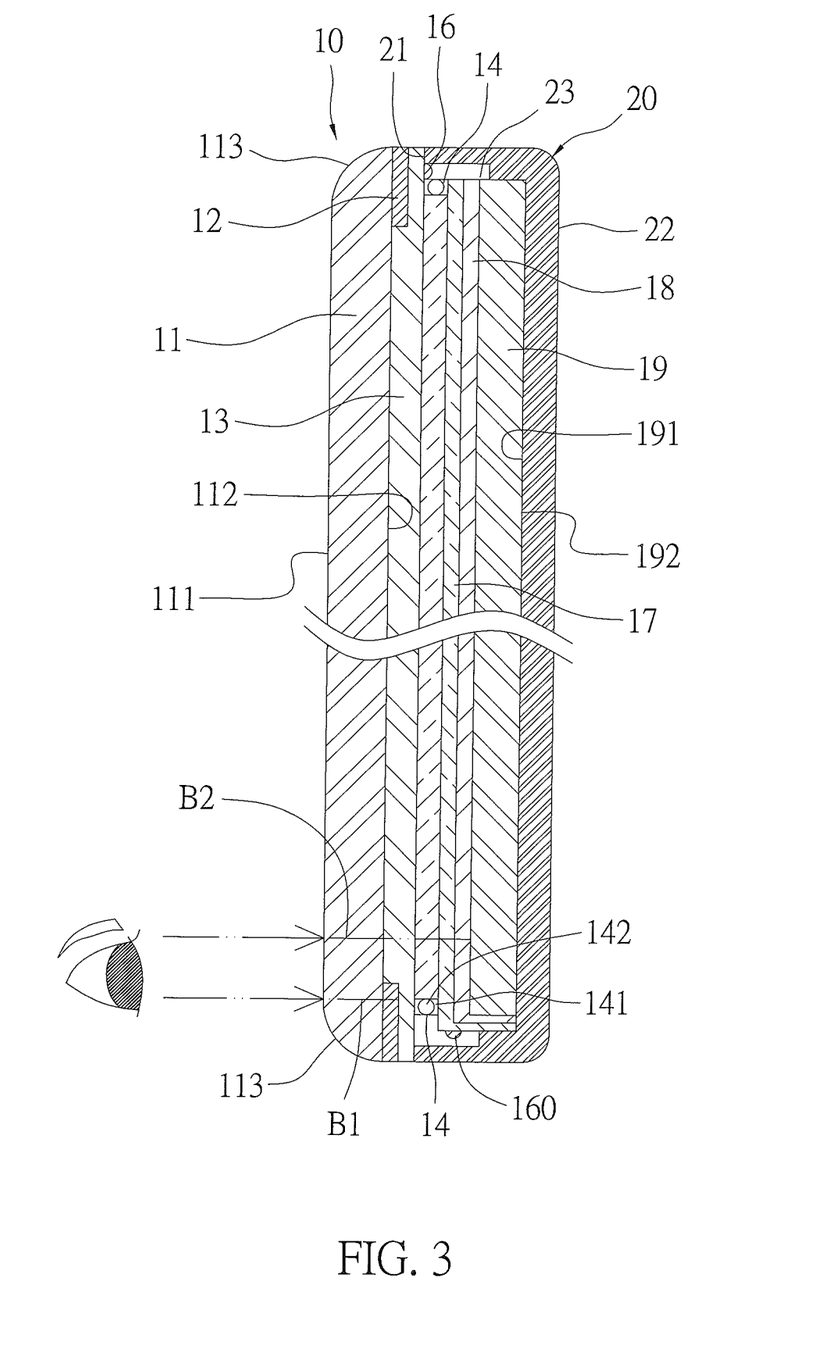
FIG. 3 is a cross sectional view showing the assembly of an electrochromic rearview mirror in accordance with a second embodiment of the present invention.

As shown in FIG. 3, the electrochromic rearview mirror further comprises a casing 20, wherein the casing 20 includes a first end face 21, a second end face 22, and a receiving cavity 23 defined in the first end face 21, wherein a size of an outer rim of the casing 20 is equal to that of the first substrate 11, wherein the packaging frame 14, the electrochromic layer 15, the first conductive glue 16, the second conductive glue 160, the third coating layer 17, the fourth coating layer 18, and the second substrate 19 are accommodated in the receiving cavity 23 of the casing 20. The first substrate 11, the first coating layer 12, and the second coating layer are located on the first end face 21 of the casing 20.

The packing frame 14, the first conductive glue 16, the second conductive glue 160, and the first end face 21 of the casing 20 are located behind the first coating layer 12 on the outer rim of the first substrate 11, such that the user cannot view the images from the first face 111 of the connection assembly 10 along the first sight line B1 or the second sight line B2. In other words, the first face 111 and the peripheral fringe 113 of the first substrate 11 are visible and reflect the images.

Figure 4:
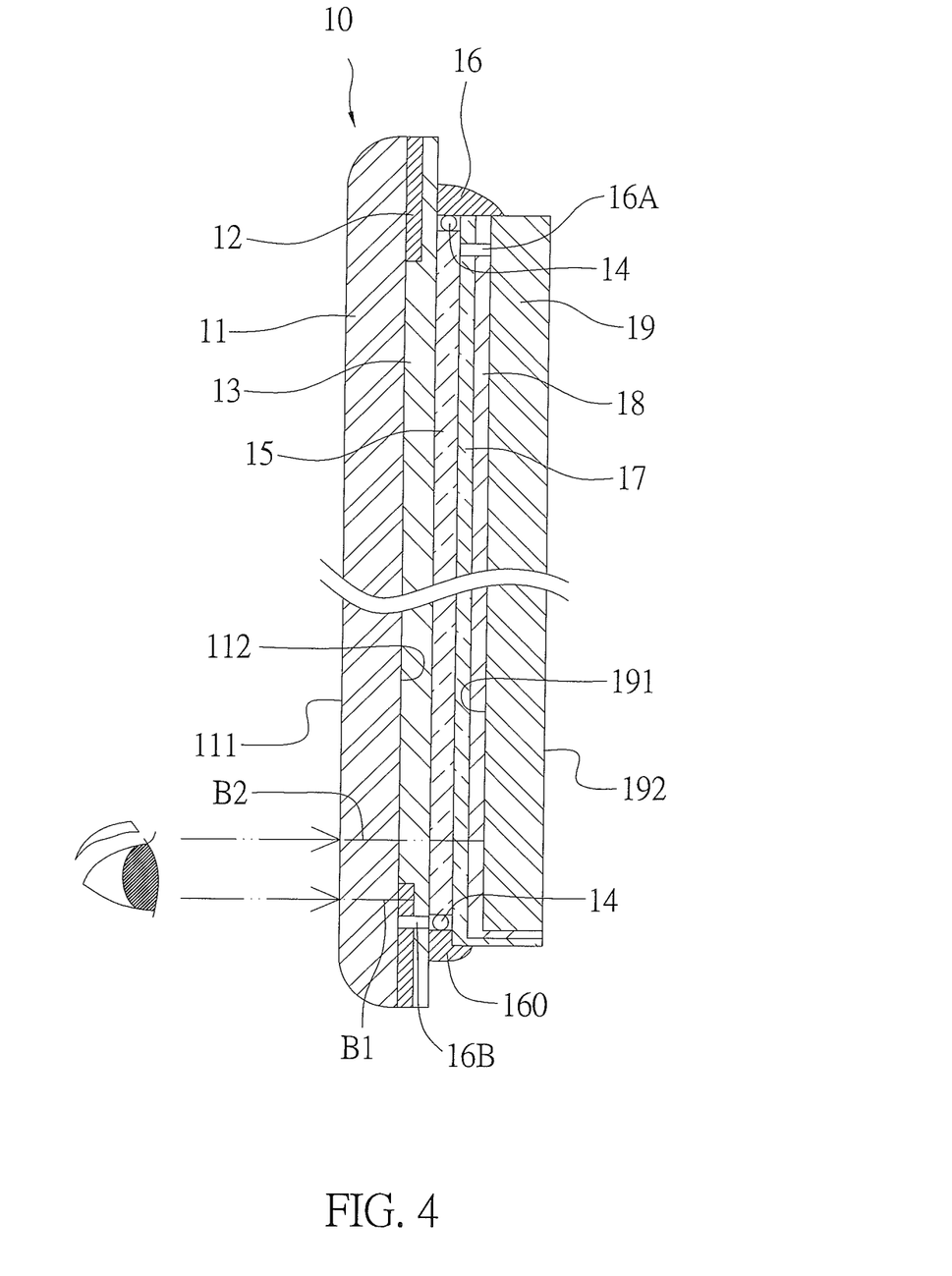
FIG. 4 is a cross sectional view showing the assembly of an electrochromic rearview mirror in accordance with a third embodiment of the present invention.

As illustrated in FIG. 4, the first conductive glue 16 and the second conductive glue 160 are arranged on the outer rim of the connection assembly 10, and the first conductive glue 16 conducts and contacts the second coating layer 13, the third coating layer 17, the fourth coating layer 18, and the outer rim of the second substrate 19, wherein the first conductive glue 16 contacts an inner surface of the third coating layer 17 and an inner surface of the fourth coating layer 18, such that a first insulation space 16A is defined between the third coating layer 17 and the fourth coating layer 18 by using laser, and the first conductive glue 16 isolates from the third coating layer 17 and the fourth coating layer 18, hence the first conductive glue 16 adheres the second coating layer 13, the electrochromic layer 15, the third coating layer 17, the fourth coating layer 18, and the second substrate 19 securely.

The second conductive glue 160 contacts and conducts the outer rim of the third coating layer 17 and the outer rim of the second coating layer 13, wherein the second conductive glue 160 contacts an inner surface of the second coating layer 13 so as to define a second insulation space 16B by using the laser, and the second conductive glue 160 isolates from the second coating layer 13.

Figure 5:
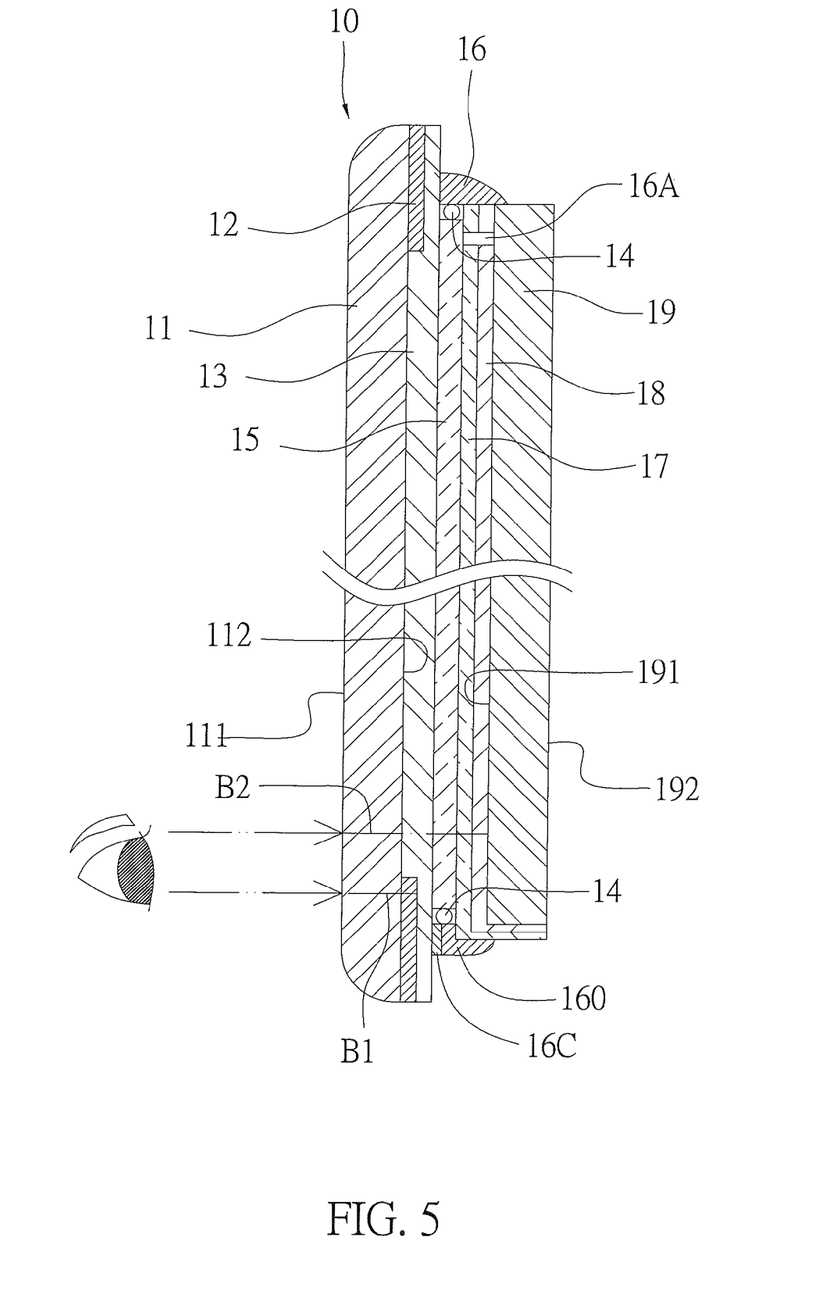
FIG. 5 is a cross sectional view showing the assembly of an electrochromic rearview mirror in accordance with a fourth embodiment of the present invention.

With reference to FIG. 5, the first conductive glue 16 and the second conductive glue 160 are arranged on the outer rim of the connection assembly 10, and the first conductive glue 16 contacts and conducts the outer rims of the second coating layer 13, the third coating layer 17, the fourth coating layer 18, and the second substrate 19, wherein the first conductive glue 16 contacts the inner surface of the third coating layer 17 and the inner surface of the fourth coating layer 18, such that a first insulation space 16A is defined between the third coating layer 17 and the fourth coating layer 18 by using the laser, and the first conductive glue 16 isolates from the third coating layer 17 and the fourth coating layer 18, hence the first conductive glue 16 adheres the second coating layer 13, the electrochromic layer 15, the third coating layer 17, the fourth coating layer 18, and the second substrate 19 securely.

The second conductive glue 160 contacts and conducts the outer rim of the electrochromic layer 15 and the outer rim of the second coating layer 13, and between the second conductive glue 160 and the second coating layer 13 is defined an isolation layer 16C so that the second conductive glue 160 contacts and isolates from the second coating layer 13.

Thereby, when the b* value of the first substrate 11, the second coating layer 13, the electrochromic layer 15, the third coating layer 17, and the fourth coating layer 18 is less than or is equal to the b* value of the first substrate 11 and the second coating layer 13, a visible color difference produces between the outer rim and interior of the first substrate 11 from the first face 111 of the first substrate 11. Preferably, the electrochromic rearview mirror has aesthetics appearance and its thickness is thin, and the peripheral fringe 113 is integrally formed on the outer rim of the first substrate 11, hence a protective frame covering a peripheral side of the electrochromic rearview mirror is not required so as to obtain large refection area.

While we have shown and described various embodiments in accordance with the present invention, it is clear to those skilled in the art that further embodiments may be made without departing from the scope of the present invention.

What is claimed is:

1. An electrochromic rearview mirror comprising: a connection assembly, and the connection assembly including: a first substrate, a first coating layer, a second coating layer, a packaging frame, an electrochromic layer, a first conductive glue, a second conductive glue, at least one third coating layer, at least one fourth coating layer, and a second substrate;

the first substrate being transparent, and the first substrate having a first face and a second face, wherein the first face faces user and is viewable by the user, and the second face is located behind the first face;

the second substrate having a third face and a fourth face, the third face being adjacent to the second face of the first substrate;

the first coating layer being arranged on an external periphery of the second face of the first substrate, and the first coating layer being in a ring shape and being configured to shield the second coating layer;

the second coating layer being transparent and mounted on the second face of the first substrate and covering the first coating layer, wherein the second coating layer conducts electricity;

each of the at least one fourth coating layer being made of metal material coating, and said each fourth coating layer being fixed on and covering the third face of the second substrate, wherein said each fourth coating layer is configured to reflect images;

each of the at least one third coating layer being disposed on the third face of the second substrate and covering said each fourth coating later, wherein said each third coating layer is configured to adjust colors and conducts the electricity;

the packaging frame and the electrochromic layer being defined among the second coating layer of the first substrate, said each fourth coating layer and said each third coating layer of the second substrate, wherein the packaging frame is annular and hollow, and two side surfaces of the packing frame are closed by the second coating layer and said each third coating layer;

the electrochromic layer producing colors or changing chroma as the electricity conducts, wherein the electrochromic layer is arranged on a hollow portion of the packaging frame and contacts the second coating layer and said each third coating layer;

wherein when the user views the first face of the first substrate from the connection assembly, a first sight line forms on the first substrate and the first coating layer, wherein the first sight line has a b* value (CIE L*a*b* (CIELAB, International Commission on Illumination L*a*b*), b* value means one of opposite spatial locations of Lab color space) and is located on an outer rim of the first substrate;

wherein when the user views the first face of the first substrate from the connection assembly, a second sight line forms on the first substrate, the first coating layer, the electrochromic layer, said each third coating layer, said each fourth coating layer, and the second substrate, wherein the second sight line has a b* value and is less than or is equal to the b* value of the first sight line;
wherein the b* value of the first line B1 is within −2 to 0, and the b* value of the second line B2 is within −5 to 0;
wherein the first conductive glue and the second conductive glue are arranged on an external surface or an outer rim of the connection assembly, the first conductive glue conducts the second coating layer, and the second conductive glue conducts said each third coating layer.

2. The electrochromic rearview mirror as claimed in claim 1, wherein the at least one fourth coating layer is at least one metal material coating layer and contains at least one oxide layer.

3. The electrochromic rearview mirror as claimed in claim 1, wherein the first conductive glue and the second conductive glue are respectively electrically connected with two electrodes of a power supply.

4. The electrochromic rearview mirror as claimed in claim 1 further comprising a casing;
wherein the first substrate has a peripheral fringe integrally arranged on the outer rim thereof, and the peripheral fringe has at least one arcuate section, an outer rim of the second substrate is less than the outer rim of the first substrate, the peripheral fringe of the first substrate is located within the first coating layer, a size of an outer rim of the second coating layer is equal to that of the first substrate, a size of an outer rim of said each fourth coating layer is less than that of the first substrate, and a size of an outer rim of said each third coating layer is less than that of the first substrate;
wherein the casing includes a first end face, a second end face, and a receiving cavity defined in the first end face, wherein a size of an outer rim of the casing is equal to that of the first substrate, wherein the packaging frame, the electrochromic layer, the first conductive glue, the second conductive glue, said each third coating layer, said each fourth coating layer, and the second substrate are accommodated in the receiving cavity of the casing, wherein the first substrate, the first coating layer, and the second coating layer are located on the first end face of the casing.

5. An electrochromic rearview mirror comprising: a connection assembly, and the connection assembly including: a first substrate, a first coating layer, a second coating layer, a packaging frame, an electrochromic layer, a first conductive glue, a second conductive glue, at least one third coating layer, at least one fourth coating layer, and a second substrate;
the first substrate being transparent, and the first substrate having a first face and a second face, wherein the first face faces user and is viewable by the user, and the second face is located behind the first face;
the second substrate having a third face and a fourth face, the third face being adjacent to the second face of the first substrate;
the first coating layer being arranged on an external periphery of the second face of the first substrate, and the first coating layer being in a ring shape and being configured to shield the second coating layer;
the second coating layer being transparent and mounted on the second face of the first substrate and covering the first coating layer, wherein the second coating layer conducts electricity;
each of the at least one fourth coating layer being fixed on and covering the third face of the second substrate, wherein said each fourth coating layer is configured to adjust colors;
each of the at least one third coating layer being made of metal material coating and being disposed on the third face of the second substrate and covering said each fourth coating later, wherein said each third coating layer is configured to reflect images and to conducts the electricity;
the packaging frame and the electrochromic layer being defined among the second coating layer of the first substrate, said each fourth coating layer and said each third coating layer of the second substrate, wherein the packaging frame is annular and hollow, and two side surfaces of the packing frame are closed by the second coating layer and said each third coating layer;
the electrochromic layer producing colors or changing chroma as the electricity conducts, wherein the electrochromic layer is arranged on a hollow portion of the packaging frame and contacts the second coating layer and said each third coating layer;
wherein when the user views the first face of the first substrate from the connection assembly, a first sight line forms on the first substrate and the first coating layer, wherein the first sight line has a b* value (CIE L*a*b* (CIELAB, International Commission on Illumination L*a*b*), b* value means one of opposite spatial locations of Lab color space) and is located on an outer rim of the first substrate;
wherein when the user views the first face of the first substrate from the connection assembly, a second sight line forms on the first substrate, the first coating layer, the electrochromic layer, said each third coating layer, said each fourth coating layer, and the second substrate, wherein the second sight line has a b* value and is less than or is equal to the b* value of the first sight line;
wherein the b* value of the first line B1 is within −2 to 0, and the b* value of the second line B2 is within −5 to 0;
wherein the first conductive glue and the second conductive glue are arranged on an external surface or an outer rim of the connection assembly, the first conductive glue conducts the second coating layer, and the second conductive glue conducts said each third coating layer.

6. The electrochromic rearview mirror as claimed in claim 5, wherein the at least one fourth coating layer is at least one metal material coating layer and contains at least one oxide layer.

7. The electrochromic rearview mirror as claimed in claim 5, wherein the first conductive glue and the second conductive glue are respectively electrically connected with two electrodes of a power supply.

8. The electrochromic rearview mirror as claimed in claim 5 further comprising a casing;
wherein the first substrate has a peripheral fringe integrally arranged on the outer rim thereof, and the peripheral fringe has at least one arcuate section, an outer rim of the second substrate is less than the outer rim of the first substrate, the peripheral fringe of the first substrate is located within the first coating layer, a size of an outer rim of the second coating layer is equal to that of the first substrate, a size of an outer rim of said each fourth coating layer is less than that of the first substrate, and a size of an outer rim of said each third coating layer is less than that of the first substrate;

wherein the casing includes a first end face, a second end face, and a receiving cavity defined in the first end face, wherein a size of an outer rim of the casing is equal to that of the first substrate, wherein the packaging frame, the electrochromic layer, the first conductive glue, the second conductive glue, said each third coating layer, said each fourth coating layer, and the second substrate are accommodated in the receiving cavity of the casing, wherein the first substrate, the first coating layer, and the second coating layer are located on the first end face of the casing.

\* \* \* \* \*